Figure 1:
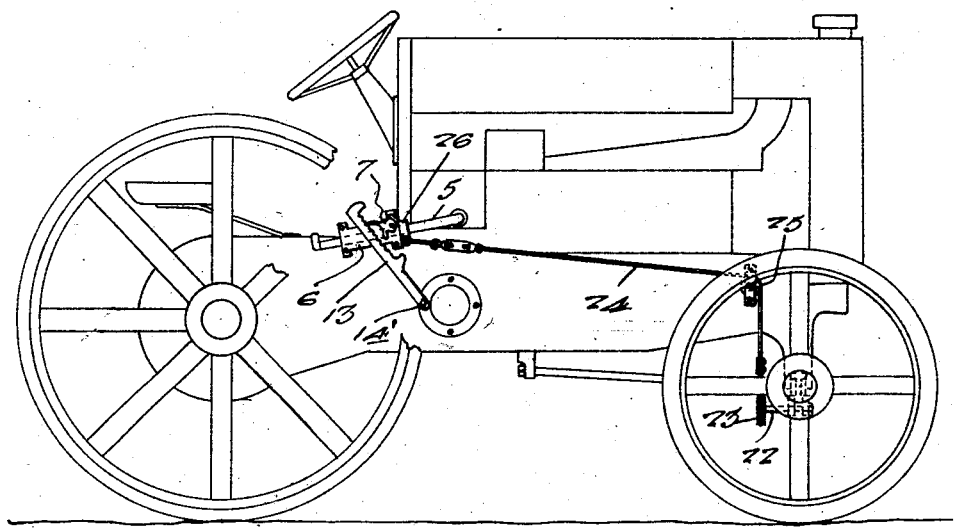

Oct. 27, 1925.

1,559,121

J. H. MOORE

TRACTOR ANTIBUCKING ATTACHMENT

Filed May 9, 1925

Inventor
J. H. Moore

By
Attorney

Patented Oct. 27, 1925.

1,559,121

UNITED STATES PATENT OFFICE.

JOHN H. MOORE, OF TIPTOP, VIRGINIA.

TRACTOR ANTIBUCKING ATTACHMENT.

Application filed May 9, 1925. Serial No. 29,103.

*To all whom it may concern:*

Be it known that I, JOHN H. MOORE, a citizen of the United States, residing at Tiptop, in the county of Tazewell and State of Virginia, have invented certain new and useful Improvements in a Tractor Antibucking Attachment, of which the following is a specification.

The present invention relates to a device which may be attached to a tractor for preventing the front end of the tractor rising up from the ground, which is occasioned because of an excessive load, and will sometimes completely upset the tractor. This especially is true with the Fordson tractors, and I have, therefore, illustrated the invention in connection with a Fordson tractor, but of course it may be adapted to any other form of tractor by suitable modifications well within the skill of the ordinary mechanic.

Another very important object of the invention is to provide an attachment of this nature which is exceedingly simple in its construction, inexpensive to manufacture, efficient and reliable in operation, strong, durable, not likely to become out of order, and otherwise well adapted to the purpose for which it is designed.

Another important object of the invention is to provide means which will tend to retain the clutch pedal in a release position after having been once released.

With the above and numerous other objects in view as will appear as the description proceeds, the invention resides in certain novel features of construction, and in the combination and arrangement of parts as will be hereinafter more fully described and claimed.

Figure 3:
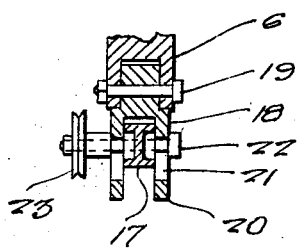
Figure 2:
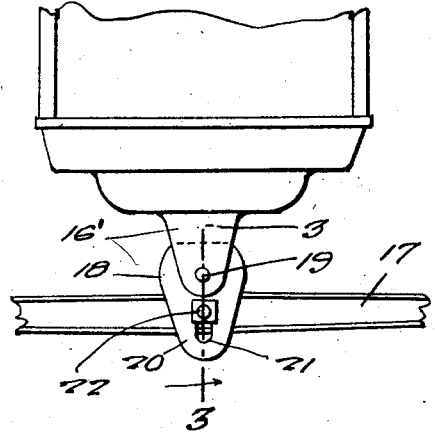
Figure 4:
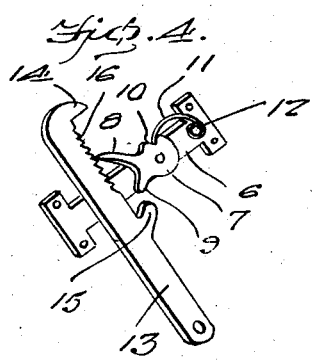

In the drawing;

Figure 1 is a diagrammatic side elevation of a tractor, showing my attachment associated therewith, Figure 2 is a fragmentary front elevation of the tractor, showing the improved manner of mounting the front axle, Figure 3 is a sectional view taken substantially on the line 3—3 of Figure 2, and Figure 4 is a perspective view showing the members associated with the clutch pedal.

Referring to the drawing in detail it will be seen that I have illustrated in a diagrammatic manner an ordinary Fordson tractor which includes among other elements the usual clutch pedal 5. A bracket 6 is fixed to the clutch pedal in any suitable manner and has pivoted thereto a pawl 7 provided with the teeth engaging finger 8, and the lug 9. The finger and lug diverge from each other. The upper edge of the pawl adjacent its pivot point is provided with a notch 10. A leaf spring 11 is attached at one end to the bracket as at 12, while its other end is in engagement with the notch 10. A plate 13 is fixed at one end to the tractor as at 14' and has one edge provided with a pair of spaced stops 14 and 15 and a plurality of teeth of the ratchet type 16 disposed therebetween. When the clutch is in and the pedal 5 is raised, the finger 8 abuts the stop 14, and the spring 11 then tends to hold this finger in engagement with the edge of the plate, so that as the pedal 5 is moved downwardly to release the clutch, the finger 8 will pass over the teeth 16, and thus the pedal may be held in a depressed or released position. However, if the pedal is pushed all the way down so that the lug 9 engages the stop 15, the pawl will be swung so the spring will normally hold the finger 8 out of engagement with the teeth 16 until said finger is engaged with the stop 14.

The depending portion 16' which is usually provided on the front of the Fordson tractor for receiving the axle 17, in my arrangement is used for receiving a bracket 18 which is pivoted thereto by the usual pin 19. This bracket includes a pair of spaced sides 20 having registering slots 21 for receiving a pin 22 extending through the axle 17 and having on its rear end a pulley 23 about which is looped a cable 24. This cable 24 is trained over a pulley 25 and is attached to a collar 26 fixed to the pedal 5.

If the tractor should buck, and the front end thereof rise upwardly, the weight of the axle 17 and the front wheel will be sufficient to move the pin 22 to the bottom of the slots 21 thereby pulling on the cable 24 sufficiently to rock the pedal 5, thus releasing the clutch and at the same time the finger 8 of the pawl 7 will engage the teeth 16 for holding the clutch in this released position, thus efficiently preventing the complete upset of the tractor.

Having thus described the invention, what I claim as new and desire to secure by Letters Patent is:

In combination, a pedal, a bracket on the pedal, a dog pivoted to the bracket and provided with an engaging finger and a lug and a notch, a spring on the bracket engaged with the notch, a plate having a pair of spaced stops with teeth disposed therebetween so that when the pedal is raised the finger engages the upper stop and the spring normally holds the pawl so that said finger will engage the teeth and when the pedal is depressed the lug will engage the lower stop and swing the pawl so that said spring will hold the finger out of engagement with the teeth until it again strikes the upper stop.

In testimony whereof I affix my signature.

JOHN H. MOORE.